(12) United States Patent
Lum

(10) Patent No.: US 7,953,897 B2
(45) Date of Patent: *May 31, 2011

(54) HYBRID INDUSTRIAL NETWORKED COMPUTER SYSTEM

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,930

(22) Filed: Apr. 14, 2010

(65) Prior Publication Data

US 2010/0195281 A1    Aug. 5, 2010

Related U.S. Application Data

(63) Continuation of application No. 12/032,268, filed on Feb. 15, 2008, now Pat. No. 7,747,787, which is a continuation-in-part of application No. 11/827,101, filed on Jul. 9, 2007, which is a continuation-in-part of application No. 11/244,313, filed on Oct. 5, 2005, now abandoned, which is a continuation-in-part of application No. 10/662,120, filed on Sep. 12, 2003, now abandoned.

(60) Provisional application No. 60/819,175, filed on Jul. 7, 2006, provisional application No. 60/927,100, filed on Apr. 30, 2007.

(51) Int. Cl.
*G06F 15/16* (2006.01)
*G06F 15/173* (2006.01)
*G06F 15/177* (2006.01)

(52) U.S. Cl. ............. 709/252; 709/203; 709/217; 705/4

(58) Field of Classification Search .......... 709/200–203, 709/217, 224, 252; 705/4, 26; 707/10
See application file for complete search history.

(56) References Cited

U.S. PATENT DOCUMENTS

| | | | |
|---|---|---|---|
| 5,294,994 | A | 3/1994 | Robinson et al. |
| D349,277 | S | 8/1994 | Merino et al. |
| 5,349,823 | A | 9/1994 | Solomon |
| 5,528,758 | A | 6/1996 | Yeh |
| 5,615,380 | A | 3/1997 | Hyatt |
| 5,694,124 | A | 12/1997 | Wood |
| 5,752,049 | A | 5/1998 | Lee |
| 5,760,690 | A | 6/1998 | French |
| 5,804,875 | A | 9/1998 | Remsburg et al. |
| 6,003,008 | A | 12/1999 | Postrel et al. |
| D428,411 | S | 7/2000 | Poole et al. |
| D428,881 | S | 8/2000 | Poole et al. |
| 6,137,591 | A | 10/2000 | Kikinis |
| 6,161,159 | A | 12/2000 | Suzuki |
| 6,271,604 | B1 | 8/2001 | Frank, Jr. et al. |
| 6,292,201 | B1 | 9/2001 | Chen et al. |

(Continued)

*Primary Examiner* — Haresh N Patel
(74) *Attorney, Agent, or Firm* — Hoffmann & Baron, LLP

(57) ABSTRACT

A Kitchen Display System (KDS) includes a workstation including a first Personal Computer (PC)-based controller, a fanless workstation including a second PC-based or a non-PC-based controller having lower cost than the first PC-based controller, an Ethernet network operatively coupling the controllers, and a bump bar, keyboard, touchscreen, or keypad operatively coupled to at least one of the controllers. The first PC-based controller stores and displays video, multimedia, or a build card. At least one of the controllers includes a rugged computing module, which includes a circuit board including an outer perimeter and traces associated therewith, an integrated circuit mounted on the circuit board, at least one interface connector, a housing, and a thermal transfer device.

29 Claims, 13 Drawing Sheets

U.S. PATENT DOCUMENTS

| | | |
|---|---|---|
| 6,297,955 B1 | 10/2001 | Frank, Jr. et al. |
| 6,359,779 B1 | 3/2002 | Frank, Jr. et al. |
| 6,369,824 B1 | 4/2002 | Lee |
| 6,389,499 B1 | 5/2002 | Frank, Jr. et al. |
| 6,411,522 B1 | 6/2002 | Frank, Jr. et al. |
| 6,501,999 B1 | 12/2002 | Cal |
| 6,507,352 B1 | 1/2003 | Cohen et al. |
| D471,191 S | 3/2003 | Yu et al. |
| 6,640,214 B1 | 10/2003 | Nambudiri et al. |
| 6,827,260 B2 | 12/2004 | Stoutenburg et al. |
| 6,842,719 B1 | 1/2005 | Fitzpatrick et al. |
| 6,914,780 B1 | 7/2005 | Shanker et al. |
| 7,747,787 B2 * | 6/2010 | Lum ............................ 709/252 |
| 2002/0039286 A1 | 4/2002 | Frank, Jr. et al. |
| 2003/0079058 A1 | 4/2003 | Lum |
| 2004/0041842 A1 | 3/2004 | Lippincott |
| 2004/0061687 A1 | 4/2004 | Kent et al. |
| 2005/0021409 A1 * | 1/2005 | Michaud et al. ................ 705/16 |
| 2005/0060444 A1 * | 3/2005 | Lum .............................. 710/36 |
| 2005/0154560 A1 | 7/2005 | Fitzpatrick et al. |
| 2005/0217300 A1 * | 10/2005 | Cheng et al. ................. 62/259.2 |
| 2005/0273345 A1 * | 12/2005 | Castillejo Romero ............ 705/1 |

* cited by examiner

HYBRID INDUSTRIAL NETWORKED COMPUTER SYSTEM

CROSS REFERENCE TO RELATED APPLICATIONS

This application is a continuation of U.S. patent application Ser. No. 12/032,268, now U.S. Pat. No. 7,747,787, which is a continuation-in-part of U.S. patent application Ser. No. 11/827,101, now co-pending, filed on Jul. 9, 2007 and U.S. patent application Ser. No. 11/244,313, now abandoned, filed on Oct. 5, 2005. U.S. patent application Ser. No. 11/827,101, now co-pending, claims the benefit of U.S. Provisional Application No. 60/819,175, filed Jul. 7, 2006. U.S. patent application Ser. No. 11/244,313, now abandoned, is a continuation-in-part of U.S. patent application Ser. No. 10/662,120, now abandoned, filed on Sep. 12, 2003. This application claims the benefit of U.S. Provisional Application No. 60/927,100 filed on Apr. 30, 2007. The disclosures of each of the above-identified applications are incorporated herein by reference.

BACKGROUND OF THE INVENTION

1. Field of the Invention

The present invention generally relates to networked computing systems. In particular, the present invention is directed to networked computing systems adapted to be used in industrial applications, such as shops, department stores, kitchens, and the like, which may include compact, full feature, rugged, and reliable computing modules having interfaces, memory capacity, and performance that can be used in a wide variety of industrial applications.

2. Description of the Related Art

In many industrial automation systems, common requirements include:
1. high reliability;
2. broad functionality;
3. low cost;
4. endurance in harsh environments including, for example, a rugged housing;
5. conformity to industry standards concerning interface protocol and network topology; and
6. small or limited physical size.

For example, one of the applications with the above demanding specifications are Kitchen Display Systems (KDS), which are used in restaurants. KDS offer many intelligent features and functionality that improve the productivity of restaurant operations. KDS must be reliable since during busy rush hours, an equipment failure in such systems is not acceptable, no matter how infrequently such failures may occur.

Typical industrial networked computing systems include microcontroller-based workstations networked using RS-485 or RS-232 interface standards with an additional control unit. More customized systems incorporate microprocessor-based workstations that are networked using Ethernet interface standards. However, neither of these approaches, when taken alone is completely successful in meeting the needs of the industry.

For example, in some applications, the performance and cost of microprocessor-based workstations may be unnecessary, and yet an Ethernet topology would be desirable to interface with existing hardware. In other network settings, a particular industrial application might require the advanced performance and capabilities of a microprocessor-based workstation at only some of its sites.

Thus, there is a need for a range of computing capabilities to be provided by a tailorable networked computing system.

The advances made in computers for personal, industrial, and military applications have been vast. These improvements include new and enhanced parallel, serial, and network interfaces; increased fixed and removable storage capacity; enhanced video, graphic, and audio processing; and operating systems that are substantially more powerful. However, the most notable achievements have been in providing greater processing speed and memory capacity.

The primary driving force in the computer industry has been to maximize speed and memory capacity in any computer solution that satisfies the customer's needs, whether that customer is an individual dreaming of the ultimate system for lifelike interactive games and multimedia applications, or a corporate user trying to find a low cost solution for relatively simple control functions. As a result, the majority of computers sold today incorporate the most advanced features. Although this may well be enticing to the individual consumer who typically buys one system every four to six years, it is inappropriate and costly for the industrial user who purchases in larger quantities with the hope for a substantially longer useful life.

In addition, for many industrial dedicated applications, small but rugged computers are desirable. In most cases, computer manufacturers simply package a full-feature computer into a smaller footprint. With significantly lower sales volume, when compared with popular consumer computers, the price of these low-volume small computers becomes exceedingly high.

Accordingly, there remains a need in the field of computer systems for an alternative computing module tailored to requirements that are essential to industrial applications, such as factory automation, health care, patient monitoring, airline counter ticketing, tracking services, restaurants, and point-of-sale (POS) terminals.

There is a further need for computing systems that operate in hot and greasy kitchen environments at high temperatures. Further, fanless operation is useful to avoid clogging by grease. Since in most restaurant facilities space is a very limited resource, the physical size of the equipment and its ruggedness are also desirable features.

There is also a need for a computing module that incorporates interfaces, memory capacity, and performance that are cost-optimized for a wide variety of industrial applications without many of the advanced features that are underutilized in such applications.

There is a further need for an industrial computing module that is compact, lightweight, rugged, reliable, and generically applicable to the majority of industrial applications.

There is yet a further need for a computing module that is highly integrated to minimize the required number of peripheral components.

There is still a further need for a computing module that incorporates the minimum number of interfaces that are most utilized in industrial applications.

Thus, there is a need for a computing module that includes a cost-effective central processing unit that satisfies the majority of industrial applications.

There is still a further need for a computing module that substantially eliminates cable connections internal to its housing to reduce failures due to loose or faulty connections therewith.

There is yet a further need for a computing module that is substantially enclosed without airflow to the inside thereof to eliminate damage from environmental conditions, such as oil and dust, typically present in industrial applications.

SUMMARY OF THE INVENTION

A Kitchen Display System (KDS) is provided in accordance with the present invention, which includes a workstation including a first Personal Computer (PC)-based controller (which may be fanless) capable of running an operating system, a fanless workstation including at least one of a second PC-based and a non-PC-based controller having lower cost than the first PC-based controller, an Ethernet network operatively coupling the controllers, and at least one of a bump bar, keyboard, touchscreen, and keypad operatively coupled to at least one of the controllers. The first PC-based controller is adapted to store and display at least one of video, multimedia, and a build card. At least one of the controllers includes a rugged computing module, which includes a circuit board including an outer perimeter and traces associated therewith, an integrated circuit mounted on the circuit board, at least one interface connector, a housing, and a thermal transfer device.

Each of the at least one interface connector is mounted at an edge of the circuit board, and the at least one interface connector is electrically coupled to the integrated circuit exclusively through the traces, thereby eliminating cable connections between points within the outer perimeter of the circuit board and points external to the circuit board. The housing encloses the computing module such that there is no air flow to the inside of the computing module and convection is not relied on to cool the rugged computing module. The housing does not include a display disposed thereon, thereby making the housing rugged. The thermal transfer device is thermally coupled to the integrated circuit and adapted to transfer heat from the integrated circuit to the housing. The thermal transfer device includes a heat pipe.

The lower cost controller may have lower performance, and at least one of the PC-based controllers may be adapted to perform a server function. The KDS may be adapted to be networked with a Point-of-Sale (POS) networked computing system. The KDS may include a plurality of thermally conductive paths between the integrated circuit and the housing, wherein at least one of the paths may include a heat pipe, at least one of the paths may not include a heat pipe, and the housing may include ridges on an external surface thereof The plurality of thermally conductive paths may include a thermally conductive material that at least partially fills a void between the housing and the integrated circuit.

A Kitchen Display System (KDS) is further provided in accordance with the present invention, which includes a workstation including a first Personal Computer (PC)-based controller (which may be fanless) capable of running an operating system, a fanless workstation including a controller having lower cost than the first PC-based controller, and an Ethernet network operatively coupling the controllers. At least one of the controllers includes a rugged computing module, which includes a circuit board including an outer perimeter and traces associated therewith, an integrated circuit mounted on the circuit board, at least one interface connector, a housing, and a thermal transfer device.

Each of the at least one interface connector is mounted at an edge of the circuit board, and the at least one interface connector is electrically coupled to the integrated circuit exclusively through the traces, thereby eliminating cable connections between points within the outer perimeter of the circuit board and points external to the circuit board. The housing encloses the computing module such that there is no air flow to the inside of the computing module and convection is not relied on to cool the rugged computing module. The housing does not include a display disposed thereon, thereby making the housing rugged. The thermal transfer device is thermally coupled to the integrated circuit and adapted to transfer heat from the integrated circuit to the housing. The thermal transfer device includes a heat pipe.

A Point-of-Sale (POS) networked computing system is provided in accordance with the present invention, which includes a workstation including a first Personal Computer (PC)-based controller, a fanless workstation including a controller having lower cost than the first PC-based controller, and an Ethernet network operatively coupling the controllers. At least one of the controllers includes a rugged computing module, which includes a circuit board including an outer perimeter and traces associated therewith, an integrated circuit mounted on the circuit board, at least one interface connector, each of the at least one interface connector being mounted at an edge of the circuit board, a housing, and a thermal transfer device. The at least one interface connector is electrically coupled to the integrated circuit exclusively through the traces, thereby eliminating cable connections between points within the outer perimeter of the circuit board and points external to the circuit board. The housing encloses the computing module such that there is no air flow to the inside of the computing module and convection is not relied on to cool the rugged computing module. The housing does not include a display disposed thereon, thereby making the housing rugged. The thermal transfer device is thermally coupled to the integrated circuit and adapted to transfer heat from the integrated circuit to the housing. The thermal transfer device includes a heat pipe.

A specialized networked computer system for commercial applications is provided in accordance with the present invention, which includes a workstation including a first Personal Computer (PC)-based controller capable of running an operating system and adapted to store and display at least one of video, multimedia, and a build card; a fanless workstation including at least one of a second PC-based controller capable of running an operating system and a non-PC-based controller having lower cost than the first PC-based controller; and an Ethernet network operatively coupling the controllers.

The specialized networked computer system may include at least one of a bump bar, keyboard, touchscreen, and keypad operatively coupled to at least one of the controllers. At least one of the controllers may include a rugged computing module including a circuit board comprising an outer perimeter and traces associated therewith, and an integrated circuit mounted on the circuit board. The specialized networked computer system may include at least one interface connector, wherein the interface connector is mounted at an edge of the circuit board, and is electrically coupled to the integrated circuit exclusively through the traces, thereby eliminating cable connections between points within the outer perimeter of the circuit board and points external to the circuit board.

The specialized networked computer system may include a housing enclosing the computing module such that there is no air flow to the inside of the computing module and convection is not relied on to cool the rugged computing module, wherein the housing does not include a display disposed thereon, thereby making the housing rugged. The system may include a thermal transfer device thermally coupled to the integrated circuit and adapted to transfer heat from the integrated circuit to the housing. the thermal transfer device may include a heat pipe. The specialized networked computer system may be adapted to be networked with a Point-of-Sale (POS) networked computing system. The specialized networked computer system may include a Kitchen Display System (KDS) and/or a Point-of-Sale System.

DETAILED DESCRIPTION OF THE PREFERRED EMBODIMENTS

Kitchen Display System

Figure 1:
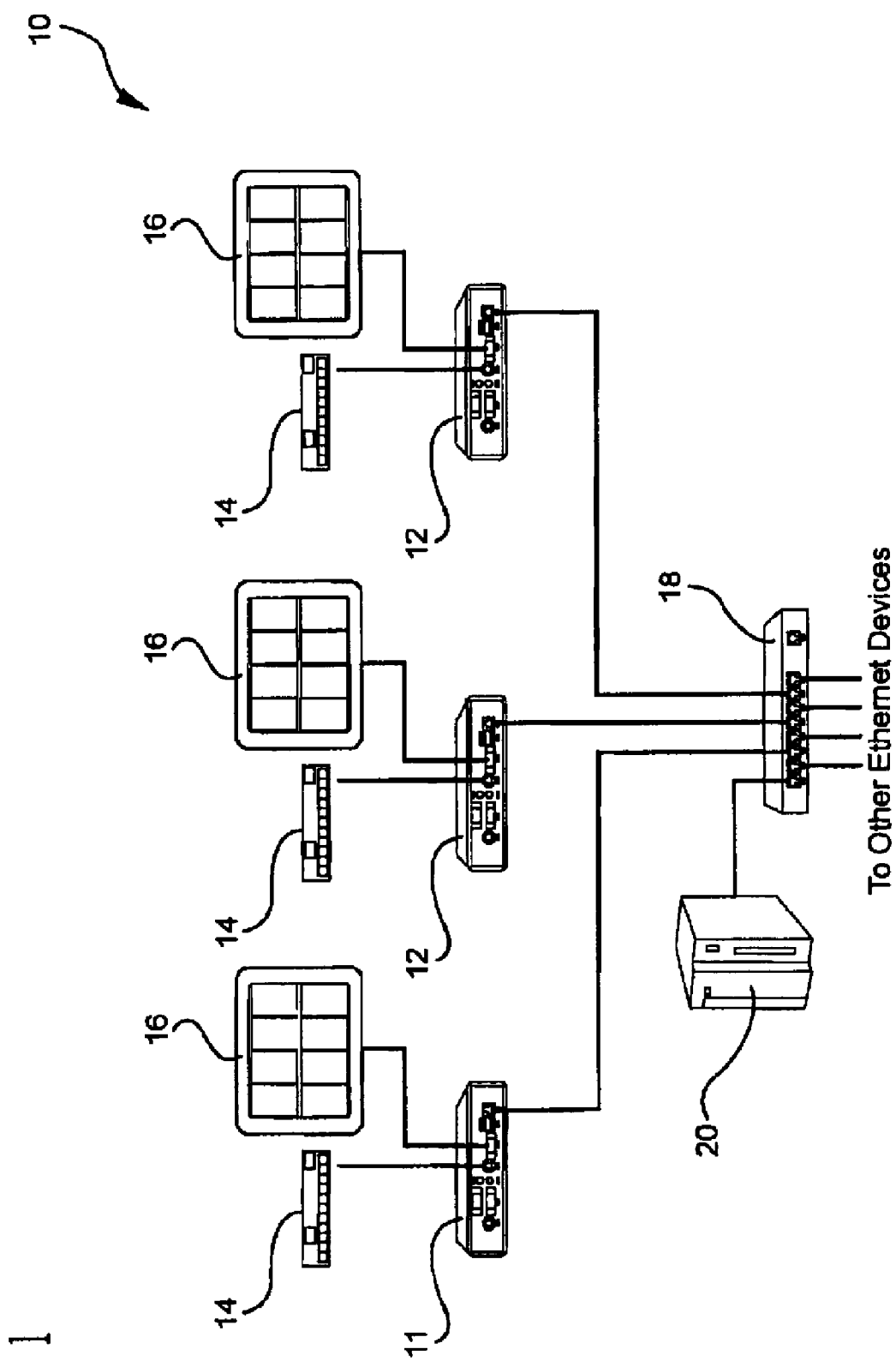
FIG. 1 is a block diagram of an industrial PC-based networked computing system.

Kitchen Display Systems (KDS) and Kitchen Video Systems (KVS) can be categorized as incorporating two types of controllers: industrial Personal Computer (PC)-based workstations and industrial non-PC-based workstations. In the industrial PC-based workstation group, a system 10 is shown in FIG. 1, which includes an industrial PC-based controller 12, a bump bar keyboard or keypad 14, a VGA monitor 16, and possibly a printer (not shown). A typical network topology used for the industrial PC-based system is also shown in FIG. 1. Each workstation is wired to a system Ethernet hub 18, which is connected to a system server 20, in which the application software resides. Thus, the typical PC-based controller includes a microprocessor that may be implemented using a chipset, which is capable of running an operating system and advanced multimedia applications.

The disadvantages of this system include:

1. Cost—the general purpose PC-based controller 12 provides far more performance than is required by most applications and can perform many advanced tasks that are not required in most KDS applications.
2. Compromised reliability—the PC is a general-purpose complicated piece of equipment that typically provides numerous sources of failure.
3. Environmental concerns—almost all PCs have a built-in fan for cooling that is prone to getting fouled in greasy kitchen environments.
4. Size—standard PCs are generally too large to fit into the limited space of a kitchen.

Figure 2:
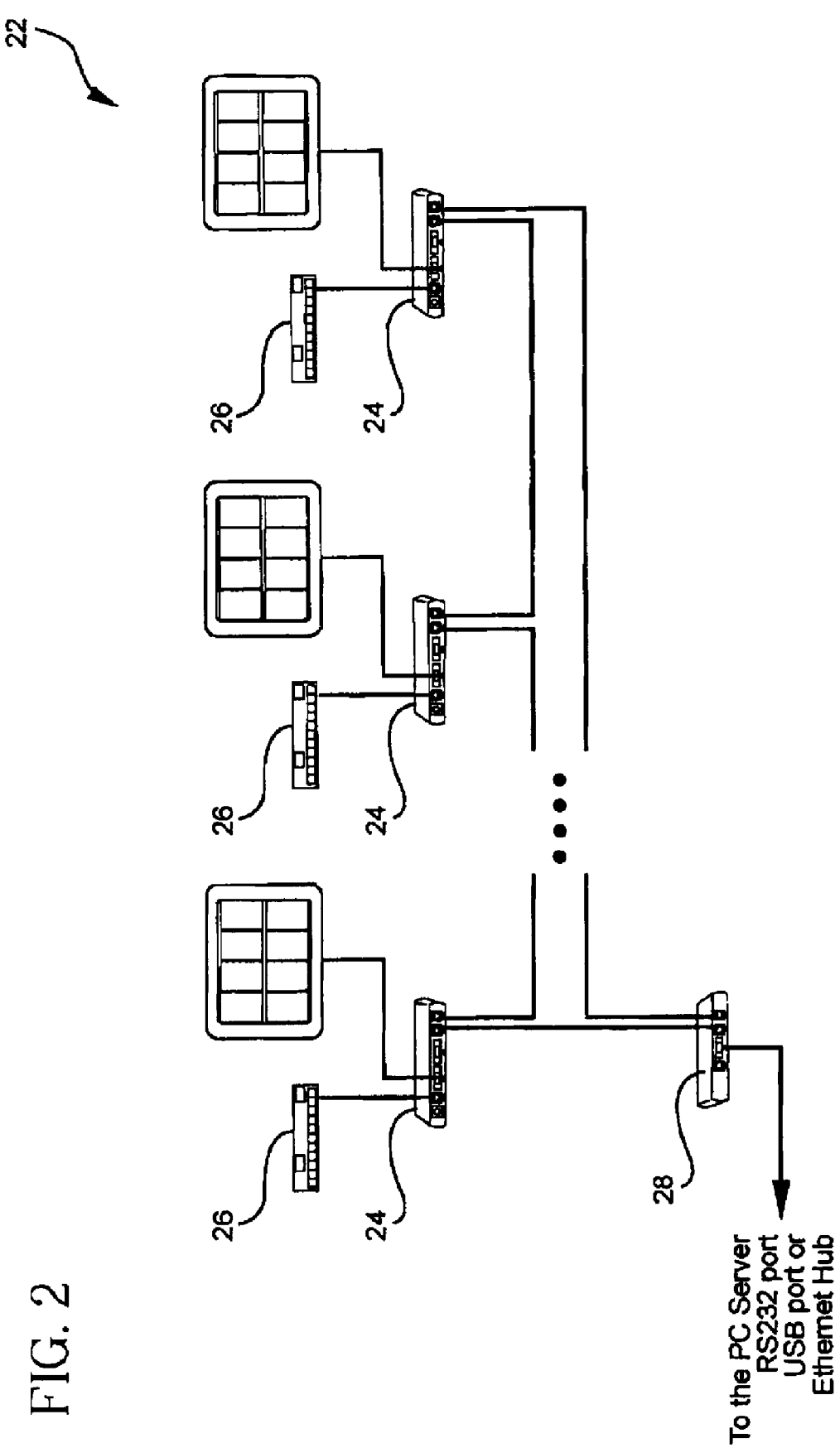
FIG. 2 is a block diagram of an industrial non-PC-based networked computing system.

In the industrial non-PC workstation group, a typical system 22 is shown in FIG. 2, which includes a non-PC-based input/output (I/O) unit or controller 24 that is much smaller than a typical PC-based controller shown in FIG. 1, a bump bar keyboard or keypad 26, a VGA monitor, and possibly a printer (not shown). The whole system may require a special master control unit 28. A typical network topology for the industrial non-PC-based system is also shown in FIG. 2. Each workstation is typically wired to a multi-drop loop or a daisy-chain loop that conforms to the RS-485 standard. As shown in FIG. 2, the controller or control unit 28 relays workstation data to an RS-232 port or Universal Serial Bus (USB) port of a system server 28, or through a system Ethernet hub (not shown) to the system server 28. Thus, the typical non-PC-based controller includes a less powerful microcontroller that is more customized for specific applications than that of the PC-based controller.

The disadvantages of this system include:

1. an unfamiliar network topology, since installers and service technicians are more familiar with Ethernet topology;
2. a lack of multimedia capability, that includes an inability to display high-resolution video; and
3. a master control unit 28 that represents substantial additional hardware overhead as an extra piece of equipment that is normally not required in industrial PC-based systems.

Additional information concerning industrial non-PC workstation systems and related matters is provided in application Ser. No. 10/714,592, filed Nov. 14, 2003 entitled "Point-of-Sale System and Distributed Computer Network for Same"; Ser. No. 11/244,313, filed Oct. 5, 2005 entitled "Rugged Industrial Computer Module"; and Ser. No. 11/431,378, filed May 10, 2006 entitled "Rugged Computer Module", which are incorporated herein by reference.

Networked Computing System

Figure 3:
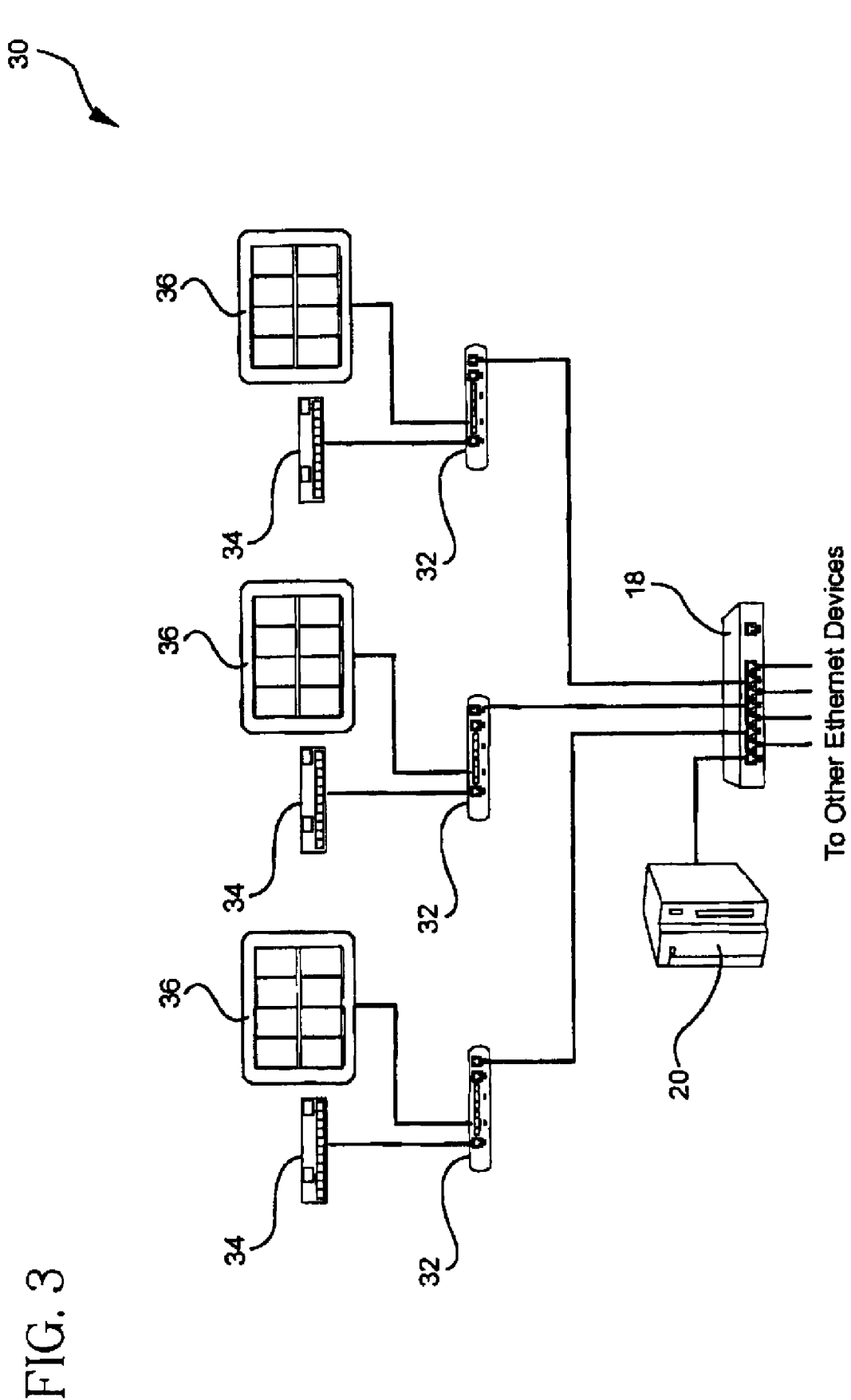
FIG. 3 is a block diagram of an industrial non-PC-based networked computing system in accordance with the present invention.

A networked computing system formed in accordance with the present invention is not limited to exclusive use as a Kitchen Display System (KDS), but may be used in any industrial application, such as but not limited to department stores, kitchens, shops, and other point-of-sale (POS) applications, Such a system offers most of the advantages while overcoming the disadvantages in the aforementioned industrial PC-based and industrial non-PC-based systems. As shown in FIG. 3, the system 30 essentially belongs to the industrial non-PC-based system group, but its network topology follows the popular PC-based system.

A typical workstation preferably includes a non-PC-based I/O unit or controller 32, a bump bar keyboard or keypad 34, a VGA monitor 36, and possibly a printer (not shown). Each I/O unit or controller 32 (LS6000) is preferably wired to a system Ethernet hub 18 that is connected to a system server 20, in which the application software resides. Because each I/O unit 32 is preferably not a PC, the aforementioned disadvantages in the PC-based system are eliminated. Further, each I/O unit 32 preferably incorporates a built-in Ethernet controller to allow straightforward connectivity to the network and avoid the need for the additional master control unit 28 shown in FIG. 2.

Figure 4A:
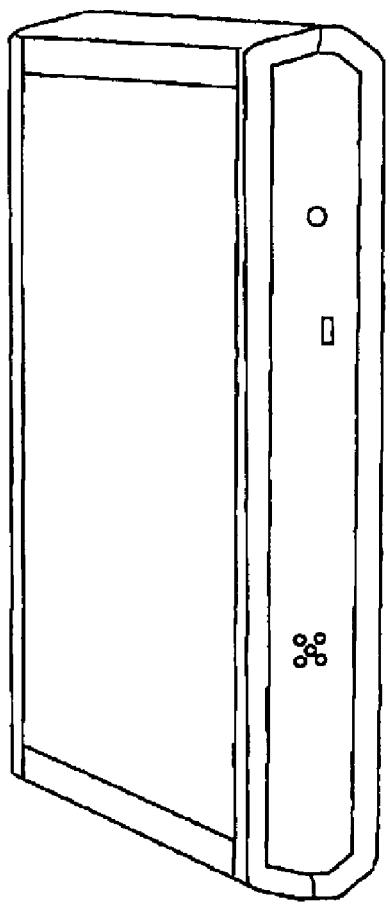
FIGS. 4A and 4B are front and rear pictorial views, respectively, of an industrial non-PC-based controller or control unit in accordance with the present invention.
Figure 4B:
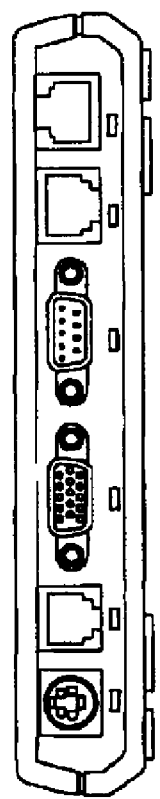
Figure 5:
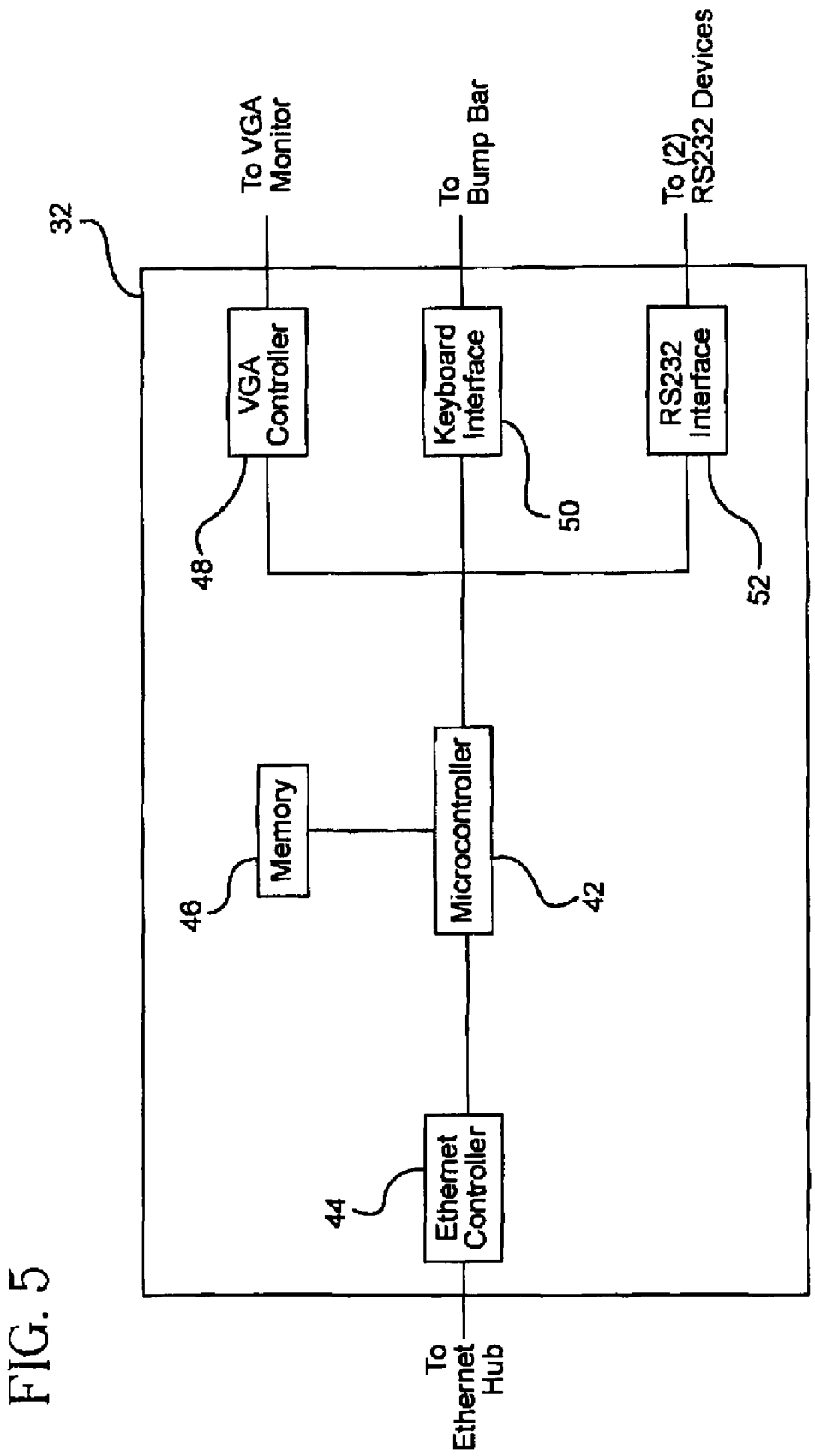
FIG. 5 is a block diagram of the industrial non-PC-based control unit shown in FIGS. 4A and 4B.

FIGS. 4A and 4B are pictorial views of the front and rear of the I/O unit 32, respectively. FIG. 5 shows a block diagram of the LS6000 which includes a microcontroller 42 (which preferably does not include an embedded microprocessor that is typically used in PC-based controllers) operatively coupled to an Ethernet controller 44, memory 46 (which can include dynamic random access memory (DRAM), erasable programmable read only memory (EPROM), read only memory (ROM), and/or any type of memory known in the art), VGA controller 48, keyboard interface 50, and RS-232 interface 52. As shown in FIG. 3, the I/O unit 32 is preferably connected to the Ethernet Hub 18 by a wireless network, but can also be networked with additional LS6000s and the server 20 wirelessly or by any other means in the art while remaining within the scope of the present invention.

Despite the fast return on initial investment, the equipment purchase price for industrial applications, such as restaurants, must be competitively low. Because a Kitchen Display System (KDS) typically operates in a hot and greasy kitchen environment, the equipment must be capable of withstanding a high operating temperature. Further, fanless operation is useful to avoid clogging by grease. To install and maintain such equipment, technicians should be able to understand operation of the equipment with a minimum of training. In most restaurant facilities, space is a very limited resource. Therefore, the physical size of the equipment and its ruggedness are desirable features.

Thus, in modern restaurant kitchen display systems (KDS), customers typically require many demanding features, which include:
1. high reliability;
2. low cost;
3. the ability to operate in hot, greasy, and high humidity environments;
4. small physical size;
5. flexible mounting options;
6. fanless operation;
7. built-in self diagnostics;
8. Ethernet topology with IP addressable workstations;
9. built-in build cards; and
10. the ability to run high-resolution video for training purposes.

Features 1 through 7 are satisfied by the controller 24 in the industrial non-PC-based system shown in FIG. 2. The enhanced controller 32 (LS6000) shown in FIG. 3 satisfies features 1 through 9. Unfortunately, controllers 24, 32 cannot run high-resolution video or other multimedia applications for training, which requires a higher-performance PC. Further, feature 10 is typically not compatible with features 1 and 2, which are also important.

Hybrid Networked Computing System

Figure 6:
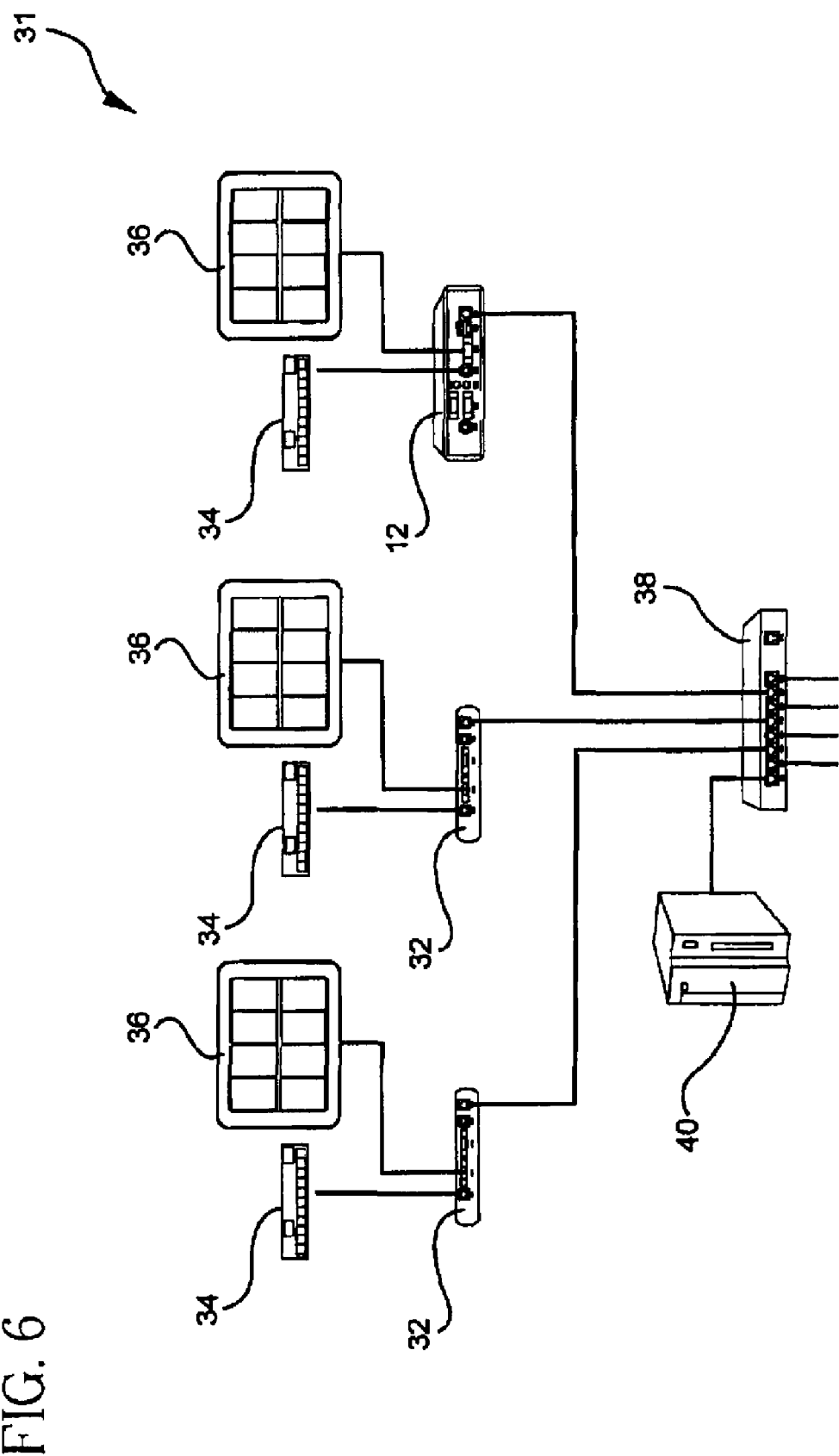
FIG. 6 is a block diagram of a hybrid networked computing system in accordance with the present invention.

FIG. 6 shows a hybrid networked computing system 31, which includes both industrial PC- and industrial non-PC-based workstations 12, 32 that are capable of interfacing to the same Ethernet hub 38. Thus, the hybrid networked computing system 54 provides multimedia and high-resolution video capabilities, which are advantageously used in the video training of employees and personnel, while incorporating the advantages of the industrial non-PC-based workstations when needed with lower cost, higher reliability, and a reduction in size. In most practical applications, only workstations needed for video or other complex multimedia presentations are PC-based workstations, while the remaining workstations in the system need only be non-PC-based workstations.

The workstations 12, 32 preferably also include firmware build cards, which can be stored in an internal Compact-Flash® or any mass storage device, but preferably comprise a solid state memory device. Such a mass storage device is preferably removable from the workstations 12, 32 and capable of being reprogrammable, for example, by downloading information through the Ethernet and/or RS-232 interfaces.

CompactFlash® (CF) cards are small, removable mass storage devices, which are well suited to the present invention, are well known in the art, weigh about a half ounce or less, and are typically the size of a matchbook. Compact-Flash® can provide complete PCMCIA-ATA functionality and compatibility.

The build cards preferably store recipes, videos, and/or programs tailored to each user's needs. For example, the build cards could enable an employee in a restaurant to learn how to prepare a particular food product without requiring personal training by more experienced employees. The workstations 12, 32 are preferably able to store a plurality of build cards or so-called "decks" of build cards.

Controllers 12, 32 preferably contain simple circuitry, which results in improved reliability and lowered cost. The hybrid system 31 shown in FIG. 6 in accordance with the present invention combines two or more types of controllers in the same KDS in such a way that the system essentially satisfies each of features 1 through 10 listed above. The hybrid system 31 is made possible by designing an industrial non-PC based controller 32 having an Ethernet interface. FIG. 6 shows that the hybrid system 31 also includes an industrial PC-based controller 12 that is preferably used to show training videos and other multimedia applications while the remaining workstations utilize more reliable and lower cost industrial non-PC-based controllers 32.

In another embodiment of the present invention, industrial PC-based controllers 11, 12 present in the system and shown in FIG. 1 have differing capabilities and/or performance characteristics. Thus, an industrial non-PC-based controller 32 in the hybrid networked system shown in FIG. 3 may be replaced with a lower performance industrial PC-based controller 11 shown in FIG. 1 when an incremental improvement in performance and/or capability is required in a particular application.

The Ethernet networks used in the present invention may incorporate so-called "home run" or "star" Ethernet topology, which is shown in FIGS. 1, 3, and 6 while remaining within the scope of the present invention. In this topology, the workstations are wired directly back to the Ethernet hub. The controllers 11, 12, 32 may further be adapted to be TCP/IP addressable while remaining within the scope of the present invention.

Figure 7:
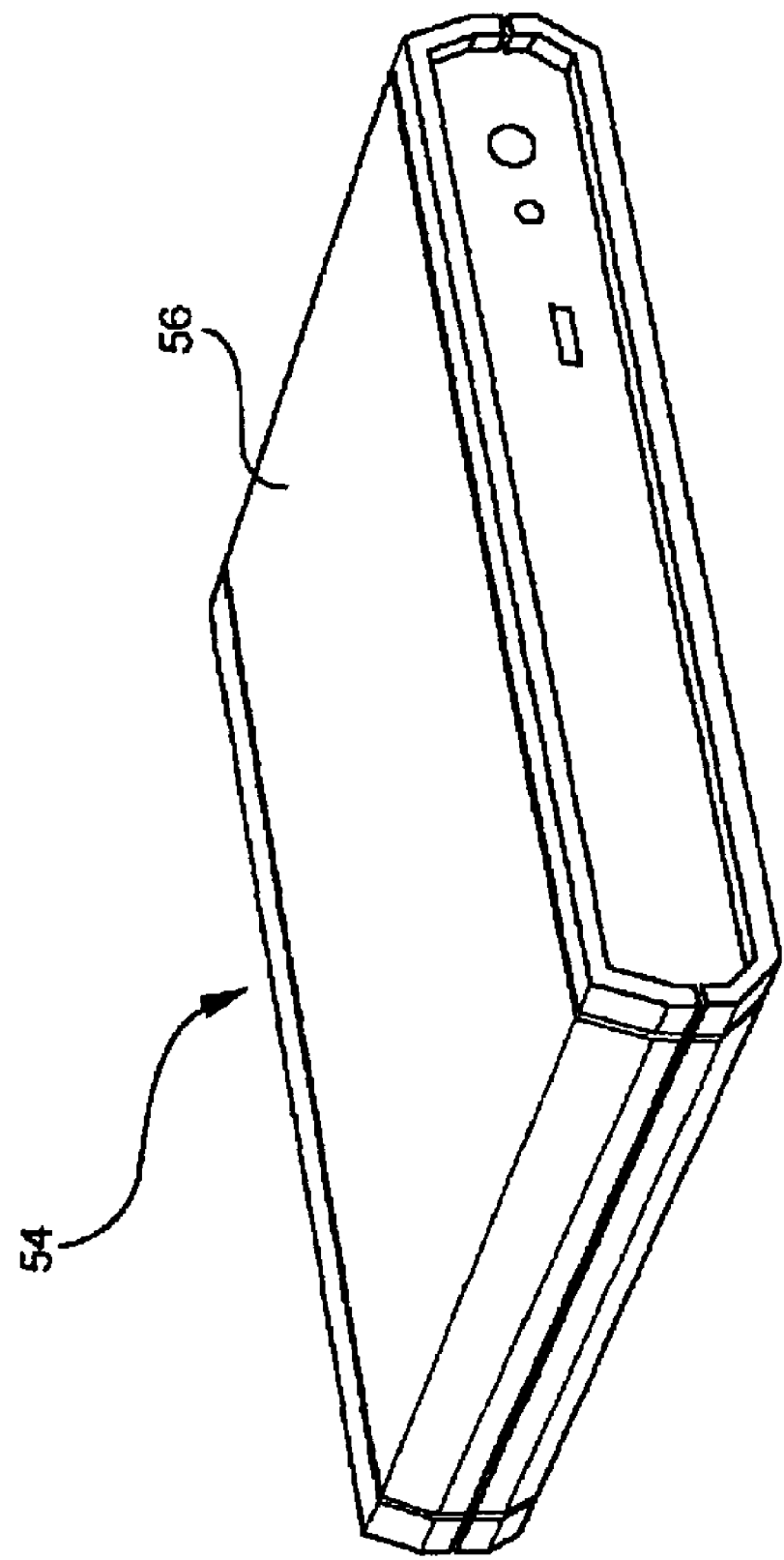
FIG. 7 is a top perspective view of a rugged computing module formed in accordance with the present invention.

In accordance with the preferred embodiments of the invention, FIG. 7 is a top perspective view of a computing module 54 which can be used as the controllers 12, 24, and 32 described above. The computing module 54 includes an external housing 56, which is preferably die cast from zinc and substantially restricts airflow to circuitry within the housing 56. The housing 56 is preferably used as a heat sink for the computing module 54. If the surface area of the housing 12 is expressed in square units, such as X in$^2$, and the volume of the housing is 56 in cubic units, Y in$^3$, then X is preferably greater than Y.

The housing 56 is preferably about 6.3 inches in width, 1.0 inch in height, and 5.1 inches in depth. The weight of the computing module 54 is about 2.15 pounds and the operating temperature is preferably about 5° C. to 40° C. with a storage temperature of about 0° C. to 60° C. Two mounting brackets (not shown) are preferably provided on the bottom of the housing 56 so that the computing module 54 may be mounted to a wall, ceiling, tabletop, counter, and the like. It is to be understood that the physical characteristics of the computing module are not critical, are merely provided as an example, and are not intended to limit the scope of the present invention in any manner.

The computing module 54 preferably includes components that are mounted on a single printed circuit board (PCB) within the external housing 56 with no moving mechanical parts, such as a fan or a disk drive. Flash memory is preferably used as a substitute for hard drive storage area.

The computing module 54 formed in accordance with the present invention preferably includes an Intel® compatible x86-based microcontroller, which is Windows® compatible and able to run Linux® based applications. The microcontroller is preferably provided with a clock that satisfies a minimum requirement of an application to reduce heat dissipation and cost. It is anticipated that the computing module 54 would be suitable for use in a wide variety of industrial applications, such as restaurant kitchen systems, point of sale (POS) systems, work stations, automatic identification systems, airline counter ticketing, tracking services, factory automation, healthcare and patient monitoring systems, and the like.

The computing module 54 also preferably provides interface capabilities, such as an Ethernet port, a Universal Serial Bus (USB) port, serial (RS-232) ports, a PS/2 keyboard/mouse port, and an SVGA (super video graphics array) port. Additional wired and wireless interface capabilities, such as infrared and Bluetooth, are contemplated to be within the scope of the present invention. The Ethernet port permits full access to the Internet, file transfer, and system networking resources. The USB port enables the computing module 54 to drive multiple peripheral devices and host a wide variety of application software.

Figure 8:
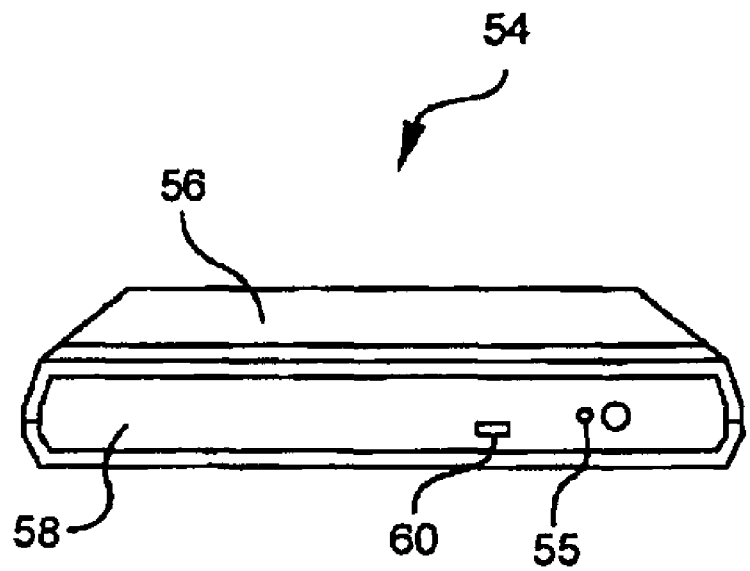
FIG. 8 is a front view of the rugged computing module formed in accordance with the present invention.

FIG. 8 is a front view of the computing module 54 formed in accordance with the present invention. The computing module 54 includes a front panel 58, through which a power light emitting diode (LED) 60 is disposed. The power LED 60 preferably indicates whether the computing module 54 is powered and operational. A reset switch on the printed circuit board is accessible through an aperture 55 in the housing 56 by using commonly objects, such as a ballpoint pen.

Figure 9:
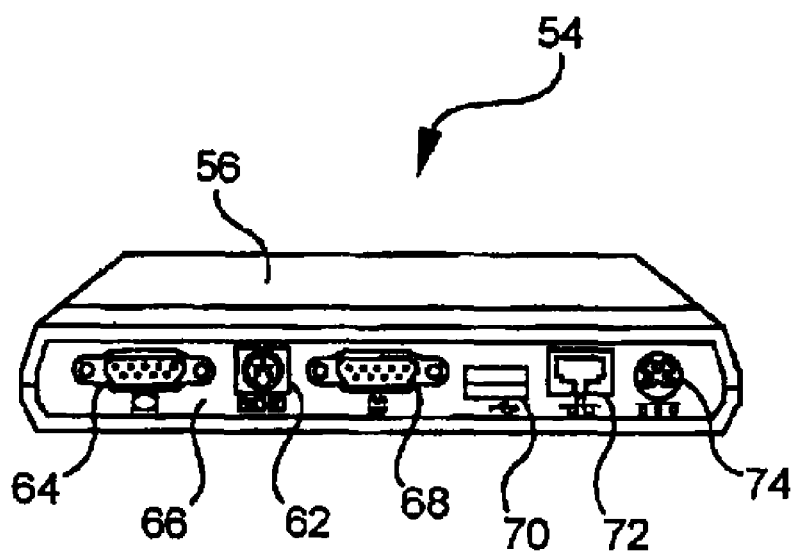
FIG. 9 is a rear view of the rugged computing module formed in accordance with the present invention.

A rear view of the computing module 54 is shown in FIG. 9. The computing module 54 includes a rear panel 62, through which various interface connectors are disposed. The interface connectors preferably include an SVGA port connector 64, a PS/2 keyboard/mouse port connector 66, a serial port connector 68, a USB port connector 70, an Ethernet port connector 72, and a power adapter connector 74.

Figure 11:
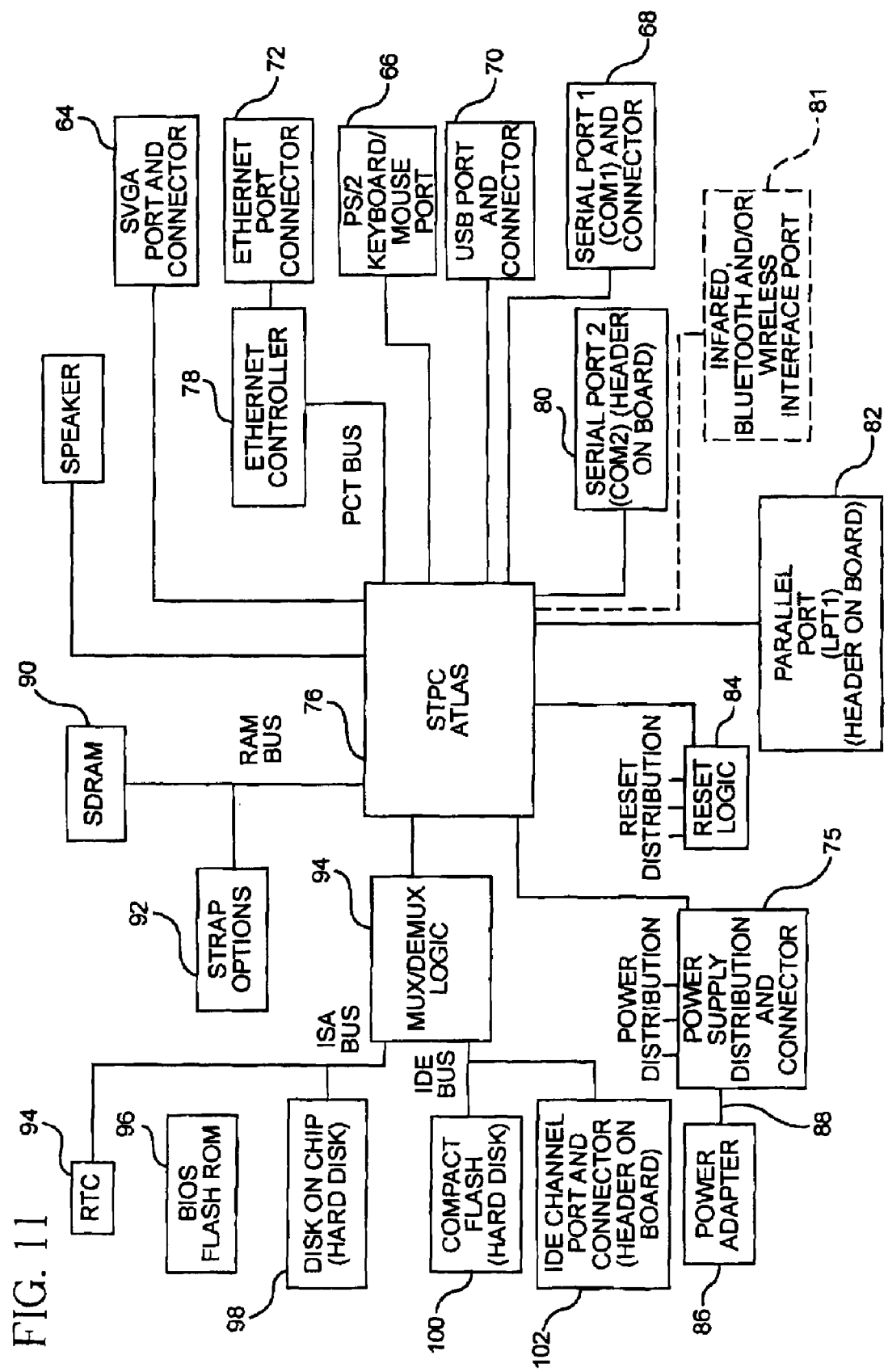
FIG. 11 is an internal view of an alternative embodiment of the rugged computing module.

FIG. 11 is a block diagram of a preferred circuit implementation of the computing module 54 shown in FIGS. 7-9. The circuitry preferably includes an STPC12HEYC microcontroller 76 operating at 133 MHz, which is a 516-pin ball grid array (BGA) package that is commercially available from ST Microelectronics, 1000 East Bell Road, Phoenix, Ariz. 85022. The microcontroller 76 is operatively coupled to an STE10/100A Ethernet controller 78 and HB626-1 Ethernet magnetic components, which are also commercially available from ST Microelectronics. The Ethernet controller 78 is operatively coupled to the Ethernet port connector 72.

The microcontroller 76 preferably also interfaces with the SVGA port and connector 64, PS/2 keyboard/mouse port and connector 66, USB port and connector 70, and the serial port and connector 68, which are shown in FIG. 9. The SVGA port preferably supports 1280×1024 pixels with 4 MB of video ram that supports up to 16 million colors. The microcontroller 76 preferably interfaces with the Ethernet controller 78 through a peripheral component interconnect (PCI) bus.

The microcontroller 76 also preferably interfaces to an auxiliary serial port 80, an auxiliary parallel port 82 and an integrated development environment (IDE) channel port and connector 102. Access to these ports is preferably provided by headers on the printed circuit board. Additional wireless interface ports 81, such as Infrared (IR) and Bluetooth Reset may also be included in the computing module. Reset logic 84, which is operatively coupled to and controlled by the microcontroller 76, preferably provides a suitable reset signal for various portions of the computing module circuitry.

The microcontroller 76 is also operatively coupled to a power supply distribution and connector assembly 75, which preferably inputs various direct current (dc) supply voltages from the power supply connector 75 located on the rear panel 62 of the computing module 54 shown in FIG. 9. Voltage converters and regulators are preferably located in a power adaptor 86, which is coupled to the power supply distribution and connector assembly 75. The power adapter 86 is preferably located external to the housing 56 and coupled to the power supply distribution and connector assembly 75 through a power cord 88.

As shown in FIG. 11, the computing module circuitry preferably includes synchronous dynamic random access memory (SDRAM) 90, which is operatively coupled to the microcontroller 76. The SDRAM 90 may be implemented using IS42S16400A-10T/7T 1Mx16x4 SDRAM devices, which are commercially available from Integrated Silicon Solution, Inc. located at 2231 Lawson Lane, Santa Clara, Calif. 95054. The computing module 54 preferably supports about 32 MB to 128 MB of SDRAM.

Various hardware programmable features are preferably selected by manipulation of jumpers in a strap options 92 circuit, which is operatively coupled to the microcontroller 76. The remaining devices shown in FIG. 11, which are preferably accessed by the microcontroller 76 through multiplexor/demultiplexor logic circuitry 94, include a real time clock 94, a BIOS flash ROM 96, a Disk-on-Chip 98, compact flash 100, and the Integrated Development Environment (IDE) channel port and connector 102. The logic circuit 94 preferably provides address, data, and control interfaces between the microcontroller 76, peripheral devices, and memory.

The real time clock 94 is preferably implemented with an M48T86MH device, which is commercially available from ST Microelectronics. The BIOS flash ROM 96 is preferably implemented using AT49F002N70JC devices, which are commercially available from Atmel Corporation located at 2325 Orchid Park Way, San Jose, Calif. 95131, or SST39SF020A devices, which are commercially available from SST located at 1171 Sonora Court, Sunnyvale, Calif. 94086.

The Disk-on-Chip flash memory 98 is preferably implemented with a Disk-on-Chip 2000, which is commercially available from M-Systems, Inc. located at 8371 Central Avenue, Suite A, Newark, Calif. 94560. The Disk-on-Chip 98 provides a solid-state alternative to hard drive storage areas to increase reliability by eliminating moving parts in the computing module 10. The Disk-on-Chip 98 and the compact flash 100 provide a solid-state storage area of about 16 MB to more than 4 GB and are preferably selected to satisfy a minimum requirement of the intended application. However, since it is contemplated that the density of memory, such as that provided by flash memory, will increase dramatically in the future in accordance with technological advances, all memory capacities set forth herein are merely intended as an example without limiting the scope of the present invention in any manner.

The real time clock 94, BIOS flash ROM 96, and Disk-on-Chip 98 are preferably accessed through an industry standard architecture (ISA) bus coupled to the microcontroller 76 through the logic circuit 94. The compact flash 100 is preferably implemented by a THNCFxxx MBA compact flash card, which is commercially available from Toshiba America Electronic Components, Inc. located at 2035 Lincoln Highway, Suite 3000, Edison, N.J. 08817. Both the compact flash 100 and IDE channel port and connector 102 are preferably coupled by an integrated development environment (IDE) bus to the microcontroller 76 through the logic circuit 94. The IDE channel port and connector 102 preferably provide the microcontroller 76 with access to an external hard drive storage area through a header or connector on the printed circuit board.

The SVGA port connector is preferably implemented with a DB15 female connector. The PS/2 keyboard/mouse port connector is preferably a mini-DIN6 female connector. The serial port connector is preferably a DB9 male connector. The USB port connector is preferably a standard USB type B connector. The Ethernet port is preferably an RJ45 8-pin female connector, and the power supply connector is preferably a shielded snap lock mini-DIN with EMI/RFI suppression female connector.

Figure 10:
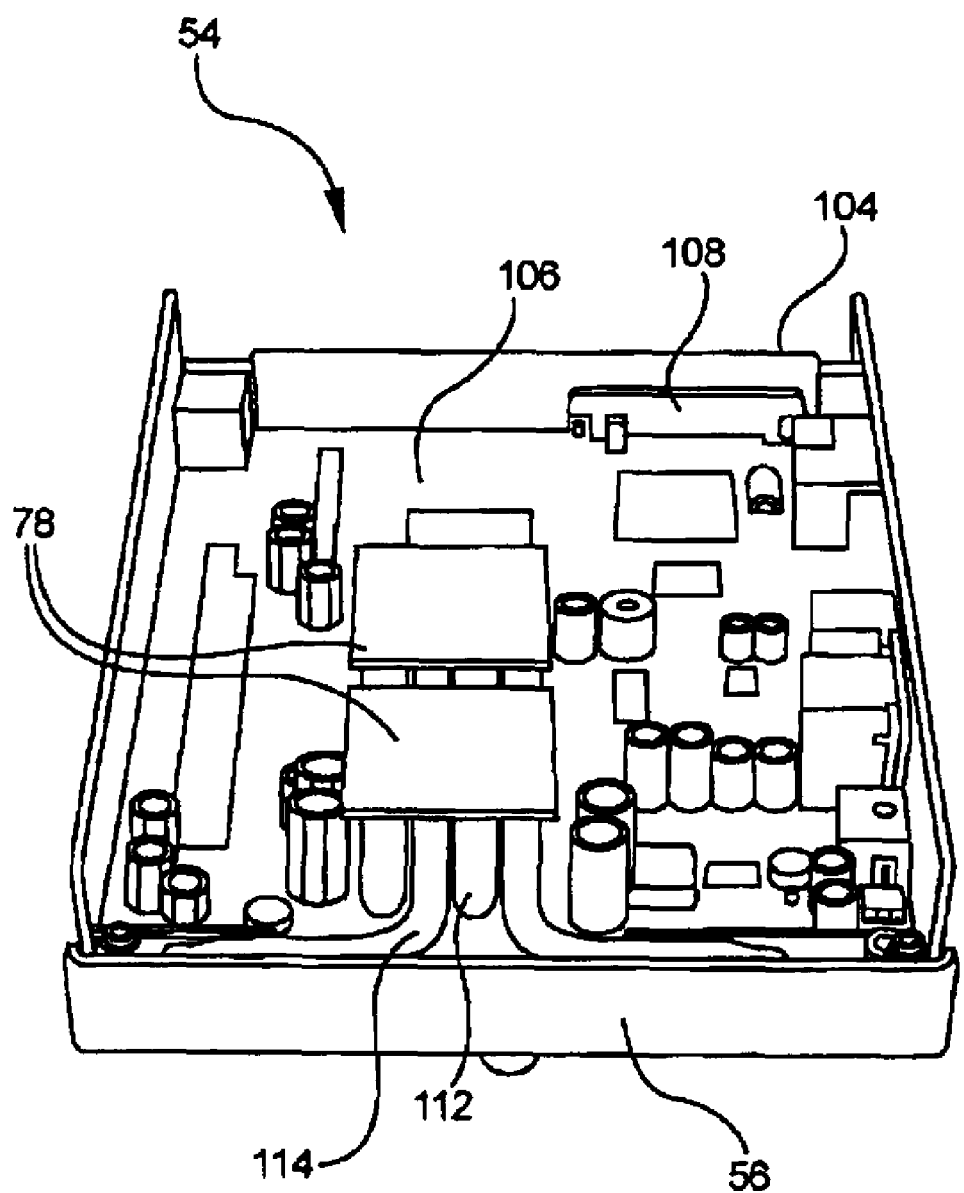
FIG. 10 is a functional block diagram of the rugged computing module formed in accordance with the present invention.

An internal view of an alternative embodiment of the computing module 54 is shown in FIG. 10. In addition to the features described above, embodiments of the present invention preferably incorporate one or more of the following features:
1. a lack of or a minimized quantity of cable connections inside the external housing 56;
2. a reduction in the size of the footprint to enable placement of the computing module 54 in locations where space is critical;
3. a rugged construction with a durable case or external housing 54;
4. a large quantity of input/output (IO) ports to support a large quantity of peripheral devices; and
5. a fanless operation.

Reducing the number of internal cable connections substantially avoids a common problem of loose or faulty connections, which is a major source of computer failure. To avoid the use of internal cable connections, substantially all connectors in the computing module of the present invention are preferably mounted at an edge 104 of the printed circuit board 106, as shown in FIG. 10. This placement alleviates the need for making connections from points within an outer perimeter of the printed circuit board 106 to points external to the computing module 54, such as those made through a connector or connector panel 108. Cable connections are defined herein to include wires, cables, and the like that may be used to electrically connect two or more points, but excludes lands or traces on printed or multilayer circuit boards.

Figure 12A:
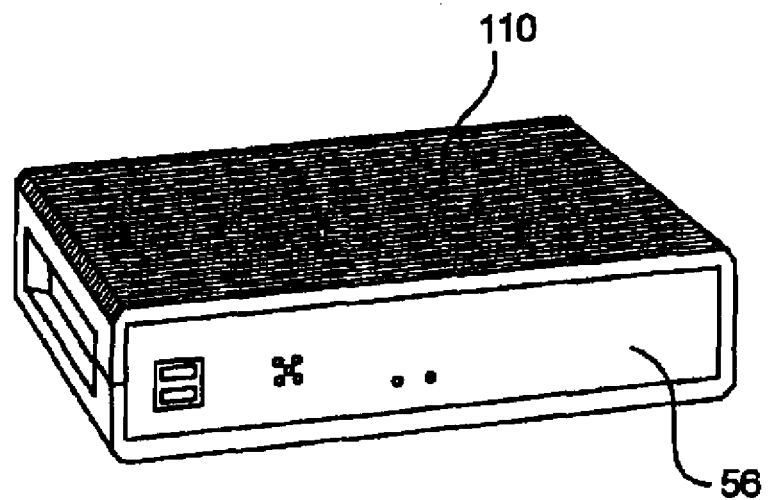
FIGS. 12A and 12B are front and rear perspective external views, respectively, of the alternative embodiment of the rugged computing module shown in FIG. 11.
Figure 12B:
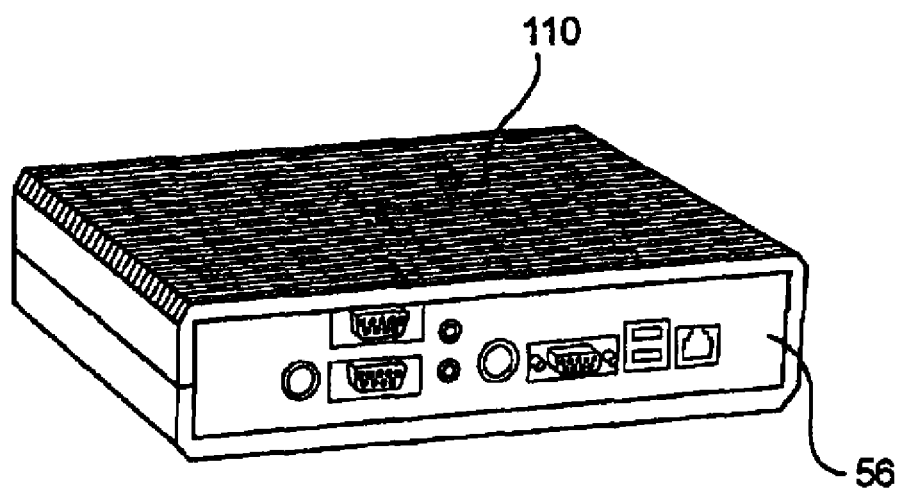
Figure 13:
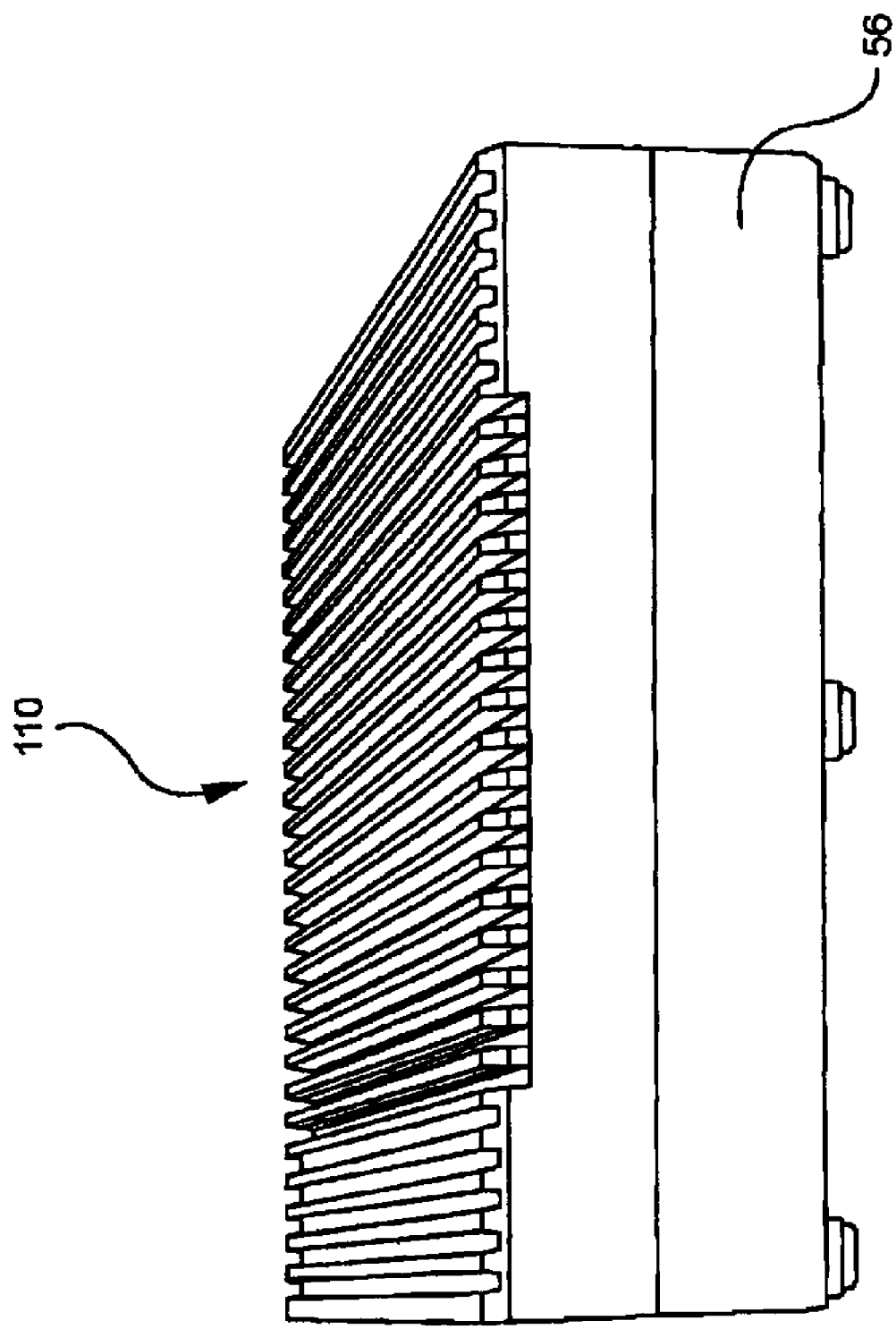
FIG. 13 is a side external view of the alternative embodiment of the rugged computing module shown in FIG. 11.

To achieve a small footprint, the printed circuit board 106 is preferably manufactured as a multi-layer board, for example having eight (8) or more layers, with a high component density layout, as shown in FIG. 10. To achieve a rugged construction, the external housing 56 is preferably die cast and incorporates grooves for heat transfer and improved rigidity. As shown in FIGS. 12A, 12B, and 13, the computing module 54 preferably includes a large quantity of connectors, such as, but not limited to RS-232, USB, and/or GPIB connectors, and the like known in the art.

Figure 14A:
FIGS. 14A, 14B, and 14C are pictorial views of a heat pipe, heat sink, and heat conducting foam, respectively, preferably used in the computing module shown in FIG. 10.
Figure 14B:
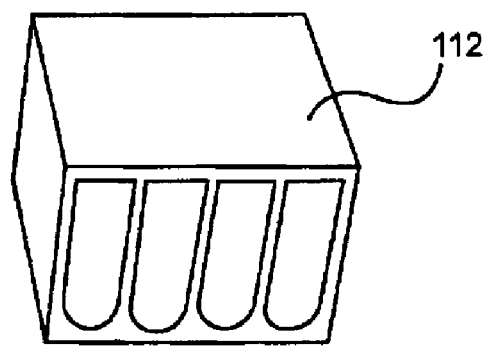
Figure 14C:
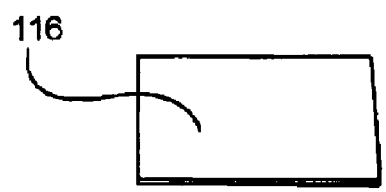

Industrial computers are preferably capable of operating in an oily or dusty environment. Thus, the commonly used internal fan is not acceptable since it draws oil or dust into the computer and causes failure. To achieve fanless operation in the computing module 54 of the present invention, thermal techniques are preferably used that include one or more of the following:
1. manufacturing the external housing to incorporate grooves, as shown in FIGS. 12A, 12B, and 13, which substantially increases the effective surface area that can be used to radiate heat to the environment;
2. using heat sinks 112, such as that shown in FIGS. 10 and 14A with partially enclosed chambers that are open at the ends of the heat sink, specifically designed for the efficient transfer of heat from the hot chip set integrated circuit (IC), such as but not limited to that used for the central processing unit (CPU), to heat pipes 114, as well as using heat conducting foam 112, as shown in FIGS. 10 and 14A;
3. using heat pipes 114 to transfer heat from the heat sinks 112 to the external housing 56, as shown in FIG. 10; and
4. using heat conducting foam 116 to transfer heat from the heat sink 112 to the external housing 56, as shown in FIG. 10.

A heat pipe is a device that can quickly transfer heat from one point to another. Heat pipes are often referred to as "superconductors" of heat since they possess an extraordinary heat transfer capacity and rate with almost no heat loss.

Heat pipes preferably include a sealed aluminum or cooper container whose inner surfaces have a capillary wicking material. A heat pipe is similar to a thermosyphon. However, heat pipes differ from a thermosyphons by virtue of their ability to transport heat against the gravitational forces present in an evaporation-condensation cycle with the help of porous capillaries that form a wick. The wick provides the capillary driving force to return the condensate to the evaporator. The quality and type of wick usually determines the performance of the heat pipe. Different types of wicks are used depending on the application for which the heat pipe is being used.

It is to be understood that the microcontroller described above can also be implemented using any computing device or set of devices, such as a microprocessor, digital signal processor (DSP), application specific integrated circuit (ASIC), gate array, and the like while remaining within the scope of the present invention.

Although illustrative embodiments of the present invention have been described herein with reference to the accompanying drawings, it is to be understood that the invention is not limited to those precise embodiments, and that various other changes and modifications may be provided therein by one skilled in the art without departing from the scope or spirit of the invention.

What is claimed is:

1. A Kitchen Display System (KDS), which comprises:
    a workstation comprising a first Personal Computer (PC)-based controller capable of running an operating system;
    a fanless workstation comprising a controller having lower cost than the first PC-based controller; and
    an Ethernet network operatively coupling the controllers, at least one of the controllers comprising a rugged computing module comprising:
        a circuit board comprising an outer perimeter and traces associated therewith;
        an integrated circuit mounted on the circuit board;
        at least one interface connector, each of the at least one interface connector being mounted at an edge of the circuit board, the at least one interface connector being electrically coupled to the integrated circuit exclusively through the traces, thereby eliminating cable connections between points within the outer perimeter of the circuit board and points external to the circuit board;

a housing enclosing the computing module such that there is no air flow to the inside of the computing module and convection is not relied on to cool the rugged computing module, the housing not comprising a display disposed thereon, thereby making the housing rugged; and a thermal transfer device thermally coupled to the integrated circuit, the thermal transfer device being adapted to transfer heat from the integrated circuit to the housing, the thermal transfer device comprising a heat pipe.

2. The Kitchen Display System (KDS) defined by claim 1, wherein the fanless workstation comprises at least one of a second PC-based controller and a non-PC-based controller.

3. The Kitchen Display System (KDS) defined by claim 1, wherein at least one of the controllers is adapted to store and display at least one of video, multimedia, and a build card.

4. The Kitchen Display System (KDS) defined by claim 1, wherein the lower cost controller has lower performance.

5. The Kitchen Display System (KDS) defined by claim 1, wherein at least one of the controllers is operatively coupled to at least one of a bump bar, keypad, keyboard, touchscreen, and printer.

6. The Kitchen Display System (KDS) defined by claim 1, wherein at least one of the PC-based controllers is adapted to perform a server function.

7. The Kitchen Display System (KDS) defined by claim 1, wherein the KDS is adapted to be networked with a Point-of-Sale (POS) networked computing system.

8. The Kitchen Display System (KDS) defined by claim 1, further comprising a plurality of thermally conductive paths between the integrated circuit and the housing, at least one of the plurality of thermally conductive paths comprising a heat pipe, at least one of the plurality of thermally conductive paths not comprising a heat pipe, the housing comprising ridges on an external surface thereof.

9. The Kitchen Display System (KDS) defined by claim 8, wherein the plurality of thermally conductive paths comprise a thermally conductive material that at least partially fills a void between the housing and the integrated circuit.

10. The Kitchen Display System (KDS) defined by claim 1, wherein the workstation comprising the first PC-based controller is fanless.

11. A Point-of-Sale (POS) networked computing system, which comprises:

a workstation comprising a first Personal Computer (PC)-based controller capable of running an operating system;

a fanless workstation comprising a controller having lower cost than the first PC-based controller; and an Ethernet network operatively coupling the controllers, at least one of the controllers comprising a rugged computing module comprising:

a circuit board comprising an outer perimeter and traces associated therewith;

an integrated circuit mounted on the circuit board;

at least one interface connector, each of the at least one interface connector being mounted at an edge of the circuit board, the at least one interface connector being electrically coupled to the integrated circuit exclusively through the traces, thereby eliminating cable connections between points within the outer perimeter of the circuit board and points external to the circuit board;

a housing enclosing the computing module such that there is no air flow to the inside of the computing module and convection is not relied on to cool the rugged computing module, the housing not comprising a display disposed thereon, thereby making the housing rugged; and a thermal transfer device thermally coupled to the integrated circuit, the thermal transfer device being adapted to transfer heat from the integrated circuit to the housing, the thermal transfer device comprising a heat pipe.

12. The Point-of-Sale (POS) networked computing system defined by claim 11, wherein the fanless workstation comprises at least one of a second PC-based controller and a non-PC-based controller.

13. The Point-of-Sale (POS) networked computing system defined by claim 11, wherein at least one of the controllers is adapted to store and display at least one of video, multimedia, and a build card.

14. The Point-of-Sale (POS) networked computing system defined by claim 11, wherein the lower cost controller has lower performance.

15. The Point-of-Sale (POS) networked computing system) defined by claim 11, wherein at least one of the controllers is operatively coupled to at least one of a keypad, keyboard, touchscreen, and printer.

16. The Point-of-Sale (POS) networked computing system defined by claim 11, wherein at least one of the PC-based controllers is adapted to perform a server function.

17. The Point-of-Sale (POS) networked computing system defined by claim 11, wherein the POS networked computing system is adapted to be networked with a Kitchen Display System (KDS).

18. The Point-of-Sale (POS) networked computing system defined by claim 11, further comprising a plurality of thermally conductive paths between the integrated circuit and the housing, at least one of the plurality of thermally conductive paths comprising a heat pipe, at least one of the plurality of thermally conductive paths not comprising a heat pipe, the housing comprising ridges on an external surface thereof.

19. The Point-of-Sale (POS) networked computing system defined by claim 18, wherein the plurality of thermally conductive paths comprise a thermally conductive material that at least partially fills a void between the housing and the integrated circuit.

20. The Point-of-Sale (POS) networked computing system defined by claim 11, wherein the workstation comprising the first PC-based controller is fanless.

21. A specialized networked computer system for commercial applications, which comprises:

a workstation comprising a first Personal Computer (PC)-based controller capable of running an operating system, the first PC-based controller being adapted to store and display at least one of video, multimedia, and a build card;

a fanless workstation comprising at least one of a second PC-based controller capable of running an operating system and a non-PC-based controller having lower cost than the first PC- based controller;

an Ethernet network operatively coupling the controllers, at least one of the controllers comprising a rugged computing module, the rugged computing module comprising a circuit board comprising an outer perimeter and traces associated therewith, the rugged computing module comprising an integrated circuit mounted on the circuit board;

a housing enclosing the computing module such that there is no air flow to the inside of the computing module and convection is not relied on to cool the rugged computing module, the housing not comprising a display disposed thereon, thereby making the housing rugged; and a plurality of thermally conductive paths between the integrated circuit and the housing, at least one of the plurality of thermally conductive paths comprising a heat pipe, at least one of the plurality of thermally conductive paths not comprising a heat pipe, the housing comprising ridges on an external surface thereof, the plurality of thermally conductive paths comprising a thermally conductive material that at least partially fills a void between the housing and the integrated circuit.

22. The specialized networked computer system for commercial applications defined by claim 21, further comprising at least one of a bump bar, keyboard, touchscreen, and keypad operatively coupled to at least one of the controllers.

23. The specialized networked computer system for commercial applications defined by claim 21, further comprising at least one interface connector, each of the at least one interface connector being mounted at an edge of the circuit board, the at least one interface connector being electrically coupled to the integrated circuit exclusively through the traces, thereby eliminating cable connections between points within the outer perimeter of the circuit board and points external to the circuit board.

24. The specialized networked computer system for commercial applications defined by claim 21, further comprising a thermal transfer device thermally coupled to the integrated circuit, the thermal transfer device being adapted to transfer heat from the integrated circuit to the housing, the thermal transfer device comprising a heat pipe.

25. The specialized networked computer system for commercial applications defined by claim 21, wherein the lower cost controller has lower performance.

26. The specialized networked computer system for commercial applications defined by claim 21, wherein at least one of the PC-based controllers is adapted to perform a server function.

27. The specialized networked computer system for commercial applications defined by claim 21, wherein the specialized networked computer system is adapted to be networked with a Point-of-Sale (POS) networked computing system.

28. The specialized networked computer system for commercial applications defined by claim 21, wherein the workstation comprising the first PC-based controller is fanless.

29. The specialized networked computer system for commercial applications defined by claim 21, wherein the commercial applications comprise at least one of a Kitchen Display System (KDS) and a Point-of-Sale System.

* * * * *